H. M. SCHNARR.
FUNNEL.
APPLICATION FILED APR. 24, 1909.
989,300.
Patented Apr. 11, 1911.
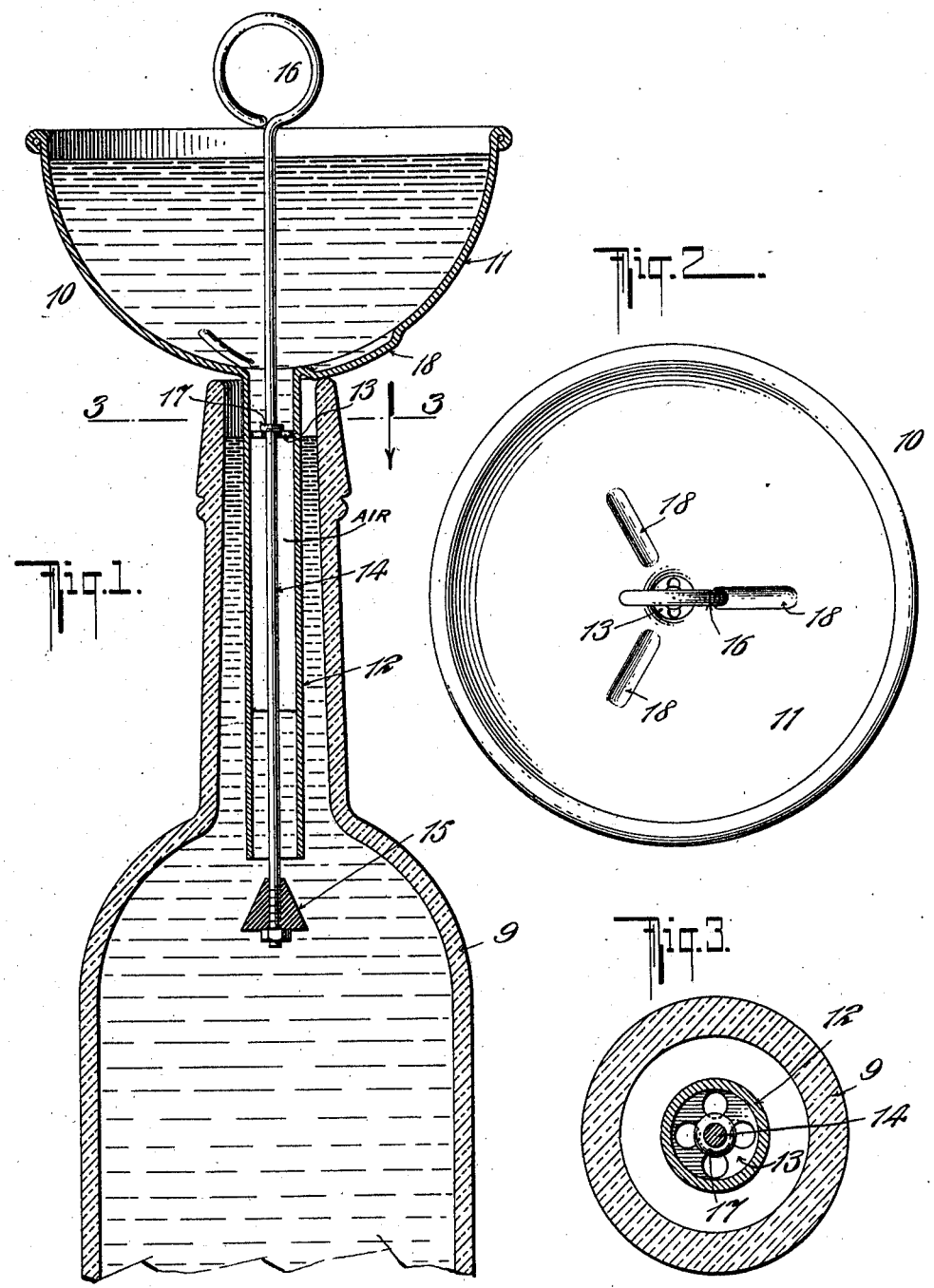
WITNESSES
INVENTOR
Henry M. Schnarr
BY
ATTORNEY

UNITED STATES PATENT OFFICE.

HENRY M. SCHNARR, OF OSSINING, NEW YORK, ASSIGNOR TO GEO. BORGFELDT & CO., OF NEW YORK, N. Y., A CORPORATION OF NEW JERSEY.

FUNNEL.

989,300.   Specification of Letters Patent.   Patented Apr. 11, 1911.

Application filed April 24, 1909. Serial No. 492,042.

*To all whom it may concern:*

Be it known that I, HENRY M. SCHNARR, a citizen of the United States, and a resident of Ossining, in the county of Westchester and State of New York, have invented certain new and useful Improvements in Funnels, of which the following is a specification.

The invention relates to improvements in funnels for use in pouring liquids into bottles and other receptacles, and it consists in the novel features and structure hereinafter described, and particularly pointed out in the claim.

The object of the invention is to provide a funnel of such proportions and character that bottles when being filled with the assistance of the funnel, will not overflow even though the funnel may contain a substantial body of liquid in its bowl after the liquid in the bottle has risen to its proper predetermined level, or has become full, leaving room only for a closure.

The funnel of my invention comprises a bowl, an elongated discharge spout, a perforated or open plate in the upper portion of said spout and a vertically movable rod extending through the funnel and said plate and carrying on its lower end a conical stopper adapted, at the proper time, to close the lower end of said spout, while the upper end of said rod is fashioned into a suitable handle or eye for convenience in carrying the funnel. The stopper provided at the lower end of the movable rod extending through the funnel is intended to be drawn upwardly against the lower end of the discharge spout when it is desired by means of said rod to lift the funnel from a bottle and to retain within the funnel such liquid as may at the time be therein, so that the funnel and its liquid contents may be conveniently lifted from one bottle or receptacle and inserted in the mouth of another bottle or receptacle. The funnel of my invention operates by its general construction to prevent the overflow of a bottle being filled, and the stopper provided for the lower end of the discharge spout is not a self-closing stopper, such as some funnels have, but is an independent device intended to seal the lower end of the spout during the period that the funnel, with its contents, is lifted from one receptacle to another.

The invention will be fully understood from the detailed description hereinafter presented, reference being had to the accompanying drawings, in which:

Figure 1 is a central vertical section through a funnel constructed in accordance with and embodying my invention and shown as having been applied to a bottle, the latter being in section and shown as having been filled with liquid and not running over, although a substantial body of the liquid remains within the bowl of the funnel; Fig. 2 is a top view of the same, with the liquid omitted from the funnel, and Fig. 3 is an enlarged transverse section through the funnel and bottle on the dotted line 3—3 of Fig. 1.

In the drawings, 10 designates the funnel as a whole, and 9 a bottle or receptacle of usual character, with the funnel applied thereto.

The funnel 10 comprises a bowl 11, a discharge spout 12 extending downwardly therefrom, a perforated plate 13 secured within the upper portion of said spout and a vertically movable rod 14 extending from above the funnel downwardly through said perforated plate and said spout and having on its lower end a conical stopper 15, while at its upper end said rod is fashioned into a handle or eye 16. Upon the rod 14 is provided a collar or shoulder 17 to engage the plate 13 and arrest the rod 14 with the stopper 15 suitably below the open lower end of the spout 12.

The bowl 11 is substantially semi-spherical or of dish-shape, so as to be able to receive a substantial body of liquid, and said bowl is preferably formed in its lower or base portion with radial downwardly projecting corrugations or ribs 18 which, when the funnel is on the mouth of a bottle or receptacle, serve to support the same and leave exit spaces between them for air from the receptacle, the air in the receptacle thus being permitted to escape as the liquid gradually fills the same.

The spout 12 is a tube, preferably having parallel sides, of considerable length as compared with funnels of ordinary type as indicated in Fig. 1. The spout 12 is considerably longer than the depth of the bowl 11 and extends downwardly into the receptacle below the line at which the latter is to be filled to a sufficient extent, in connection with the plate disk 13, to prevent the receptacle from overflowing even though a considerable body of liquid is within the bowl after the liquid in the receptacle has reached its predetermined level or said receptacle has become properly filled. It is this latter result that I attain by means of my invention, my object having been to produce a funnel which, whether used carelessly or otherwise, will automatically prevent, without the use of floats or valves, the overflow of the bottle or receptacle.

In Fig. 1 I illustrate the bottle as having become properly filled and the funnel as having a substantial body of liquid therein and held thereby, said liquid in the funnel remaining stationary and not, as would be the case with the ordinary funnel, running through the discharge spout into and rapidly overflowing the bottle.

In the use of the funnel, the spout 12 is inserted downwardly into the mouth of the bottle or other receptacle, as usual, and the liquid to be dispensed is poured into the bowl of the funnel and replenished therein as rapidly as may be convenient. No care need be taken as to the rising level of liquid in the bottle or receptacle, since regardless of the quantity of liquid poured into the bowl, the bottle or receptacle will not overflow, but the liquid therein will rise to the proper level and thereafter no further liquid will pass from the funnel into the receptacle, even though as I illustrate in Fig. 1, a substantial body of liquid may, after the bottle or receptacle has become properly filled, remain in the bowl of the funnel. Since the openings in the disk 13 are much less in area than a cross section of the interior of the spout 12, the liquid flows therethrough in a small stream which does not exhaust the air from the spout and when the liquid in the vessel being filled rises above the lower end of the spout the air is confined in the spout, since on account of the small openings in the disk it does not escape up through the liquid in the funnel. When the difference in the level of the liquid in the vessel and that in the funnel is approximately equal to the length of the air space in the spout, as shown in Fig. 1, equilibrium is established, since the weight of the air is practically negligible, and the flow of liquid from the funnel ceases. The liquid remaining in the funnel, after the bottle or receptacle has become filled, will not be wasted, since the funnel and its contents may be transferred to another bottle or receptacle by means of the rod 14 and stopper 15. When desiring to transfer the funnel with its contents from one receptacle to another, the user will draw the rod 14 upwardly to carry the stopper 15 into the lower end of the discharge spout 12 and lift the funnel, by means of said rod, from the bottle or receptacle, the stopper preventing the discharge from the funnel and enabling the latter, with its contents, to be safely transported.

My invention is of particular convenience in filling a series of bottles arranged in rows, since with the use of a series of funnels the latter may be poured into, one after another, until the bottles have become filled and the outflow from the funnels has automatically ceased, and thereupon the funnels may be quickly removed from the filled bottles and inserted in unfilled bottles and the liquid already in the bowls permitted to descend into the latter bottles, the attendant as before continuing to pour into the funnels, one after another, without devoting any attention whatever to the question as to whether or not the bottles have become filled. The attendant may always know that the bottles have become filled from the fact that the liquid ceases to flow from the funnels into the bottles, which is quite different from the common experience of discovering that the bottles have become filled by observing that they are overflowing.

The stopper 15 is not a float for automatically closing the lower end of the spout 12 and it always remains in its lower open position, except when the attendant, by taking hold of the handle 16, draws the rod 14 upwardly to seat said stopper, and this takes place when it is desired to transfer the funnel from one bottle or receptacle to another. The perforated plate 13 permits the liquid to flow through it, and the stop 17 on the rod 14 prevents said rod from settling downwardly to an undue or unnecessary extent.

My invention thus resides in a funnel having a bowl and spout, with a restriction in the spout to prevent the air being driven therefrom, so proportioned as to automatically avoid the overflow of a vessel being filled, and the funnel being provided with manually operative means for sealing the liquid that may be contained within it after the vessel has become filled, so that the funnel may be conveniently transferred from the filled receptacle to another receptacle without waste of the liquid.

What I claim as my invention and desire to secure by Letters-Patent, is:

A funnel comprising a bowl of dish-shape, a discharge spout extending from the bottom thereof and greater in length than the depth of said bowl, an open plate 13 disposed within said spout near the upper end thereof, a rod 14 extending through said bowl, spout and plate and having a shoulder 17 to engage said plate for arresting said rod against undue descent, a handle on the upper end of said rod and a conical stopper 15 on the lower end of said rod for sealing the lower end of said spout, said spout being proportioned to extend sufficiently below the line at which a vessel is to be filled to automatically avoid the overflow of said receptacle by liquid contained within the bowl of the funnel.

Signed at New York city, in the county of New York, and State of New York, this 23rd day of April A. D. 1909.

HENRY M. SCHNARR.

Witnesses:
ARTHUR MARION,
CHAS. C. GILL.

Copies of this patent may be obtained for five cents each, by addressing the "Commissioner of Patents, Washington, D. C."